United States Patent
Fevre

[15] 3,693,337
[45] Sept. 26, 1972

[54] TUBULAR STRANDING MACHINES
[72] Inventor: Charles M. Fevre, Lyon, France
[73] Assignee: Societe Stephanoise De Constructions Mechaniques
[22] Filed: April 20, 1971
[21] Appl. No.: 135,701

[30] Foreign Application Priority Data
April 21, 1970 France..................7014459

[52] U.S. Cl. ...............57/58.32, 57/58.34, 57/104
[51] Int. Cl. ..........................................D07b 3/12
[58] Field of Search ..........57/34 R, 1 R, 58.3, 58.32, 57/58.34, 92, 104, 105

[56] References Cited

UNITED STATES PATENTS

| | | |
|---|---|---|
| 2,147,065 | 2/1939 | Somerville..............57/58.32 |
| 2,416,126 | 2/1947 | Somerville..............57/58.32 |
| 3,456,433 | 7/1969 | Cloostermans-Huwaert............57/104 X |

FOREIGN PATENTS OR APPLICATIONS

| | | |
|---|---|---|
| 898,956 | 6/1962 | Great Britain............57/58.32 |
| 971,321 | 9/1964 | Great Britain............57/58.32 |

Primary Examiner—Donald E. Watkins
Attorney—John Lezdey

[57] ABSTRACT

A tubular stranding machine comprising rotatable tubular sections coaxially arranged and longitudinal spaced to support therebetween cradles carrying wire spools or bobbins. Each tubular section is supported on elastic or resilient bearings and is driven from a common main drive shaft through a secondary drive shaft pivotally supported on the main drive shaft. Transmission belts or gearing connect the main drive shaft and each secondary drive shaft, and each secondary drive shaft and its corresponding tubular section.

7 Claims, 4 Drawing Figures

TUBULAR STRANDING MACHINES

This invention relates to tubular stranding machines.

Tubular stranding machines, constituted by a plurality of substantially coaxial, tubular sections, preferably longitudinally spaced in a regular manner, are known. These tubular sections each rest, in known manner, on bearings rigidly fixed to the frame of the machine, and may, consequently, each be driven through the intermediary for example, of a belt which, in order to do this, co-operates with a single common main drive shaft for the tubular sections.

However, the mounting of the tubular sections in rigid bearings promotes the generation of vibrations and especially occasional vibrations which may occur as a result of an imperfect balancing during the operation of the rotating sections. This is why, inter alia, it can be seen that the distribution of wires at the periphery of a certain number of sections ia assymetric. If the wires have a large diameter, the resulting imbalance is not inconsiderable. This is one of the reasons why perfect balancing has never been achieved on this type of stranding machine. Thus it is desirable to reduce or even suppress the transmission of vibrations.

With this in mind, the applicants firstly considered elastically or resiliently suspending the bearings of the various tubular sections. This gave rise to the problem of driving the individual sections since the bearings became mobile relative to the frame. After having studied this problem, the applicants resolved same by using a novel drive for the stranding machine, which is the object of the present invention.

Thus, the present invention is a tubular stranding machine comprising a frame, a plurality of substantially coaxial and longitudinally spaced tubular sections, bearings fixed to the frame for supporting the tubular sections, a main shaft for rotating the tubular sections, elastic or resilient means mounting the bearings on the frame, a secondary drive shaft provided for each tubular section and rotatably mounted in a hanger pivotal about the main drive shaft, and means for drivingly connecting, on the one hand, the main drive shaft to each secondary drive shaft, and, on the other hand, each tubular section to the corresponding secondary drive shaft.

Preferably, the drive means connecting each tubular section to the corresponding secondary drive shaft is constituted by a belt which cooperates with the tubular section and the said secondary shaft, means being provided for tensioning the said belt.

Advantageously, the means for tensioning the belt is constituted by a body integral with the hanger which is pulled by gravity in the direction of the secondary drive shaft which it supports relative to the corresponding tubular section.

However, the tensioning means may also be constituted by a resilient member connecting the hanger to the frame of the stranding machine and provided so as to produce a force tending to pivot the hanger about the axis of the main shaft in the direction of the secondary drive shaft.

Advantageously, the present invention may be applied to the bearings supporting each tubular section which are constituted by air-cushioned bearings which may be mounted elastically on the frame.

Moreover, advantageously and preferably, two adjacent tubular sections have their opposing and adjacent edges connected by cables for synchronizing the rotating movements which are imparted to these two tubular sections.

An embodiment of the present invention will now be described, by way of example, with reference to the accompanying drawings, in which.

Figure 1:
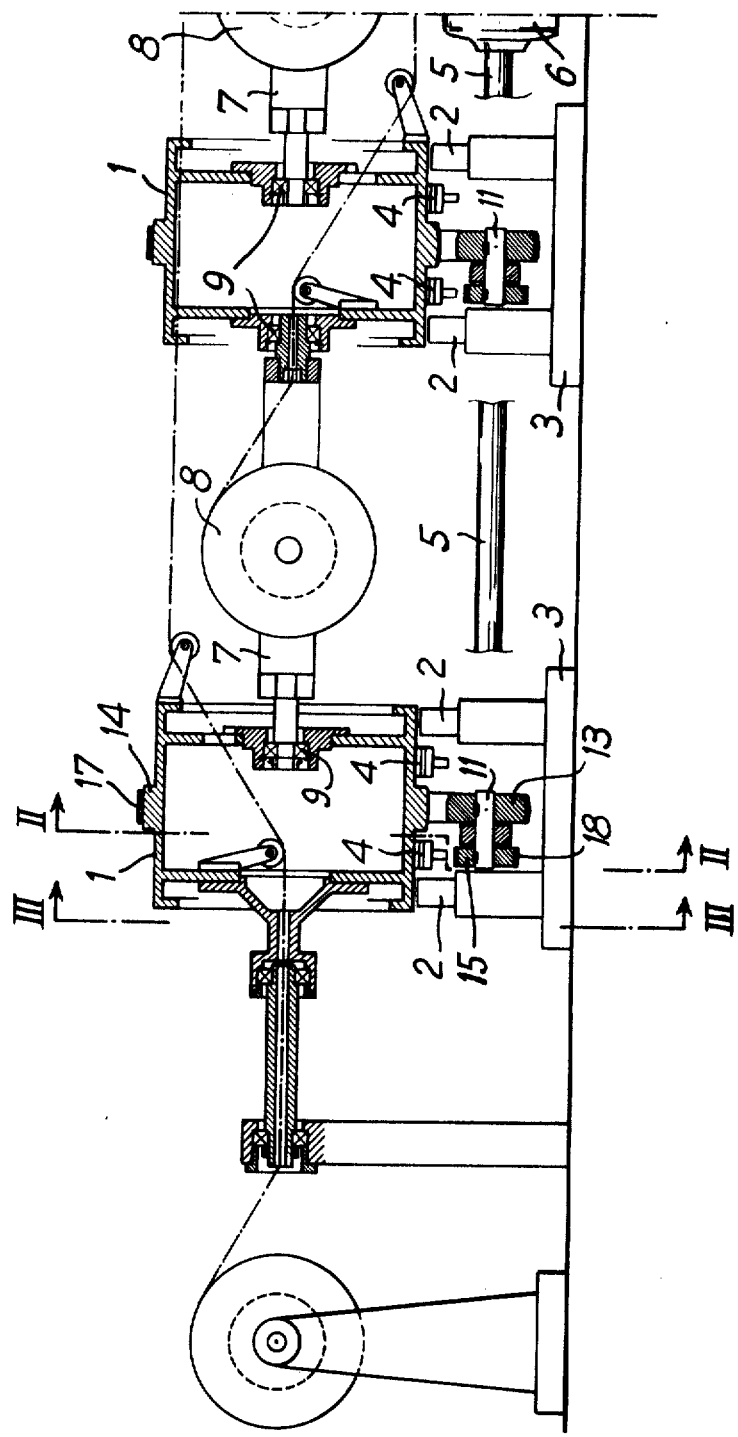
FIG. 1 is a part-sectional elevation of a stranding machine according to the invention.
Figure 2:
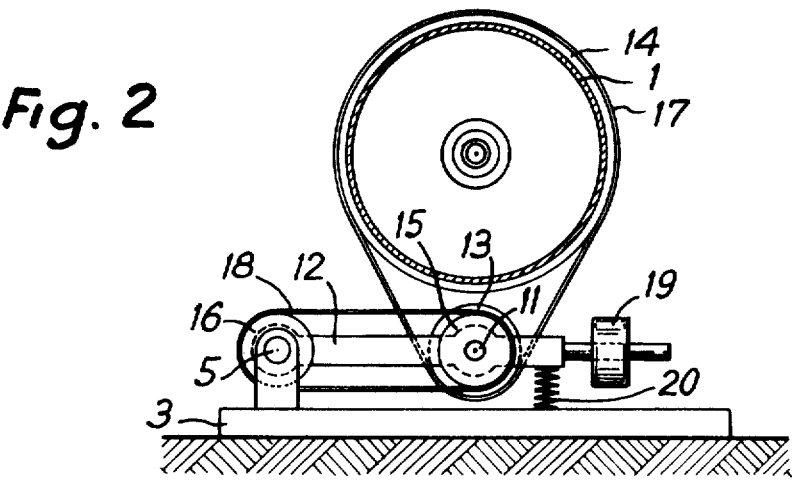
FIG. 2 is a section on the line II—II of FIG. 1.
Figure 3:
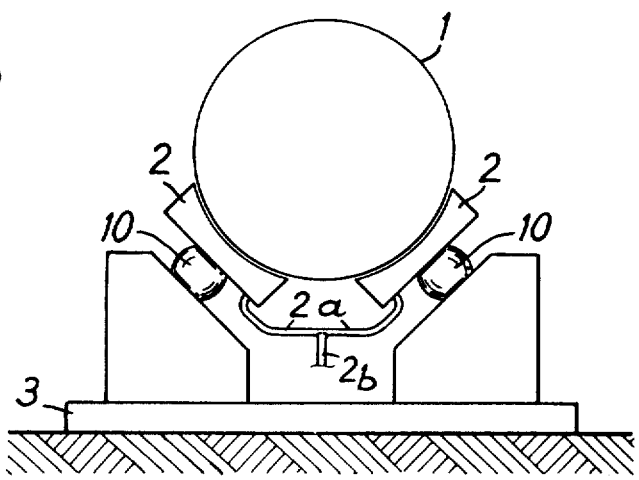
FIG. 3 is a section on the line III—III of FIG. 1.

The stranding machine comprises a plurality of tubular sections 1, which are located substantially coaxially to each other and which are longitudinally spaced. Each tubular section 1 is supported on bearings 2 fixed to the frame 3 of the stranding machine. Brake shoes 4 are provided, in known manner, for each tubular section 1, and the drive for the tubular sections comprises a main drive shaft 5, which extends parallel to the axes of the tubular sections along the stranding machine and is coupled to a drive motor 6. Also in known manner, cradles 7 for bobbins 8 rest in bearings 9 integral with the tubular sections 1. It is not necessary to describe in detail other standard parts of the machine which the man skilled in the art will recognize without difficulty from the drawings.

However, the arrangement for driving and supporting each of the tubular sections 1 will be described in detail.

The bearings 2 are fixed, as has been said, to the frame 3. However, it will be noted that elastic or resilient cushions 10, for example, of rubber, are interposed between each bearing 2 and the frame 3. In addition, in order to ensure a satisfactory support for each tubular section 1, in the embodiment shown, four bearings, in two groups of two, are provided. A group of two bearings is located at each axial end of each tubular section 1, while the two bearings of each group are located on either side of the longitudinal, vertical plane passing through the axes of the tubular sections 1.

It will be noted that a secondary drive shaft 11 is provided for each section 1, and in the present case is substantially parallel to the main drive shaft 5. This secondary shaft 11 is mounted to rotate in bearings 12 carried by a hanger which is pivotally mounted on the main shaft 5. A pulley 13 is fast with each secondary shaft 11 and is located opposite a machined surface 14 of the tubular section 1, which surface constitutes a pulley. Another pulley 15 is also fast with the secondary shaft 11 and is located opposite a pulley 16 fast with the main shaft 5. A belt 17 drivingly connects the pulley 13 and the machined surface 14, and a belt 18 drivingly connects the pulleys 15 and 16.

It will also be noted that the hanger with its bearings 12 is urged by gravity in the direction of the tension of the belt 17. For this purpose, a counter-weight 19 may be made integral with the hanger. As a modification and possibly jointly with the counter-weight, it is possible to provide a spring 20 connected between the hanger and the frame 3, the action of which is to ensure tensioning of the belt 17 by pivoting the hanger downwardly about the main shaft 5.

The bearings 2 themselves may possess, and sometimes them alone (without cushions 10) a certain elasticity or resiliency. This is the case, for example, with air-cushioned bearings which are connected by pipes 2a to a main pipe 2b supplying fluid under pressure. But, even in this case, it is also possible, and it is moreover advantageous, to mount these bearings on the frame 3 with the interposition of the cushions 10.

Figure 4:
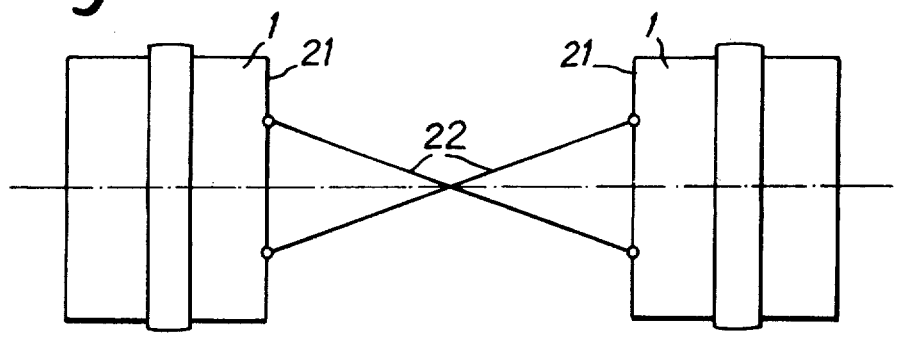
FIG. 4 is a partial plan view of a stranding machine according to the invention showing the connection between two adjacent tubular sections.

Finally, it will be noted that, very advantageously two adjacent tubular sections 1 may have their adjacent edges 21 connected by cables 22 for synchronizing their rotating movements (see FIG. 4).

The operation of the above-described stranding machine is very advantageous as will be described.

In fact, it is stated that in addition to the advantages inherent in known devices, which are retained, there are other advantages amongst which there will firstly be noted a substantial decrease in the transmission of possible vibrations. This result may appear quite natural to the man skilled in the art, but it is necessary to stress its novelty in the field of stranding machines. Due to a lack of suitable drive arrangements, it was necessary until now, to drive each tubular section 1, from the main shaft with or without a secondary shaft, but in all cases with a rigid or non-deformable transmission. Thus, the tubular sections 1 were to be mounted on rigid bearings rigidly fixed to the frame 3. The result was an intense transmission of vibrations, the source of which could be any one of the tubular sections 1 during its rotation, and an inefficient operation due to a local accidental deficiency in the stranding machine.

With the drive arrangement according to the invention, a non-rigid or deformable transmission has been obtained. This involves the fixing of the bearings 2 on the frame 3 by means of elastic or resilient cushions 10 or the provision of fluid-cushioned bearings and due to this the vibration problem discussed above has been solved.

It will be manifest that the elasticity or resiliency may be that of the bearing 2 itself, if, for example, the latter is air-cushioned. It is an advantage to employ this technique when it is desired to produce a stranding machine with a high speed of rotation, which has the advantage of a high output. The invention naturally allows the use of air-cushion bearings.

It should be noted that previously with the technique of using air-cushion bearings, it was an advantage to mount these bearings elastically or resiliently on the frame 3. This is an additional reason for adopting the idea of the invention.

Finally, taking into account the freedom of movement of the tubular sections 1 on their bearings, made permissible by the new transmission of the rotating movements between the main drive shaft and each tubular section 1, it is possible that, in certain extreme cases, a slight sliding is produced between each belt 17 and one of the pulleys 13 or 14, with which it cooperates. In order to ensure a satisfactory synchronization of the rotational movements of the various tubular sections 1, it has been found advantageous, for the use of the invention, to connect by means of synchronization cables 22, adjacent tubular sections 1 (FIG. 4). In this way, staggering of the various tubular sections is limited to arrangements which are admissible for a correct operation of the stranding machine.

It should be noted that the transmission by the belts 17 and 18 which has the advantage of simplicity, may have various mechanical equivalents, such, for example, as a gear transmission made in a form very similar to that of the belt transmission. It is not necessary to dwell on the description of such a transmission, which the man skilled in the art will provide without difficulty with a knowledge of the invention.

It is mentioned, solely for interest, that the drive belts may be toothed, especially the belt 17 which provides a good synchronization of the rotation of the various tubular sections, a synchronization which may be sufficient in certain stranding machines, for eliminating the use of synchronization cables, such as the cables 22.

What is claimed is:

1. A tubular stranding machine comprising a frame, a plurality of substantially coaxial and longitudinally spaced tubular sections, bearings fixed to the frame for supporting the tubular sections, a main shaft for rotating the tubular sections, elastic or resilient means mounting the bearings on the frame, a secondary drive shaft provided for each tubular section and rotatably mounted in a hanger pivotal about the main drive shaft, and means for drivingly connecting, on the one hand, the main drive shaft to each secondary drive shaft, and, on the other hand, each tubular section to the corresponding secondary drive shaft.

2. A tubular stranding machine according to claim 1, in which the drive means connecting each tubular section to the corresponding secondary drive shaft is constituted by a belt which cooperates with the said tubular section and the said corresponding secondary shaft, means being provided for tensioning the belt.

3. A tubular stranding machine according to claim 2, in which the means for tensioning the belt is constituted by a body connected with the hanger, which is urged by gravity away from the corresponding tubular section.

4. A tubular stranding machine according to claim 2, in which the tensioning means is constituted by a resilient member connecting the hanger to the frame and located so as to produce a force tending to pivot the hanger about the main shaft towards the secondary drive shaft.

5. A tubular stranding machine according to claim 1 in which the bearings supporting each tubular section are air-cushioned bearings.

6. A tubular stranding machine according to claim 5, in which the air-cushioned bearings are mounted on the frame with the interposition of elastic or resilient supports.

7. A tubular stranding machine according to claim 1 in which adjacent tubular sections have their adjacent opposing edges connected by cables for synchronizing the rotating movements imparted to the two tubular sections.

* * * * *